(12) United States Patent
Lee

(10) Patent No.: US 7,477,838 B2
(45) Date of Patent: Jan. 13, 2009

(54) LIGHT BOX FOR OPTICAL MODULE TEST

(75) Inventor: Chang Yuan Lee, Chu Pei (TW)

(73) Assignee: UMA Technology Inc., Jubei, Hsinchu (TW)

( * ) Notice: Subject to any disclaimer, the term of this patent is extended or adjusted under 35 U.S.C. 154(b) by 378 days.

(21) Appl. No.: 11/515,880

(22) Filed: Sep. 6, 2006

(65) Prior Publication Data

US 2007/0297777 A1 Dec. 27, 2007

(30) Foreign Application Priority Data

Jun. 22, 2006 (TW) .............................. 95210888 U

(51) Int. Cl.
*G03B 43/00* (2006.01)
(52) U.S. Cl. .......................................... 396/4; 348/188
(58) Field of Classification Search .................... 396/1, 396/4; 348/187, 188
See application file for complete search history.

(56) References Cited

U.S. PATENT DOCUMENTS

2003/0156194 A1* 8/2003 Sugiura et al. .............. 348/187

* cited by examiner

*Primary Examiner*—W. B. Perkey
*Assistant Examiner*—Fang-Chi Chang
(74) *Attorney, Agent, or Firm*—Muncy, Geissler, Olds & Lowe, PLLC

(57) ABSTRACT

A Light box for optical module test is disclosed. The light box is designed to have at least a light source, a beam splitting unit, an optical filtering module and two optical fibers. The optical filtering module is formed with a plurality of filters and arranged between the light source and the beam splitting unit to generate a variety of color temperatures of the light beam from the light source before the light beam enters the beam splitting unit. Thereafter, the light beam is uniformly divided by the beam splitting unit into a first light beam and a second light beam which are transmitted via the optical fibers, respectively, and projected onto a test chart.

8 Claims, 4 Drawing Sheets

LIGHT BOX FOR OPTICAL MODULE TEST

BACKGROUND OF THE INVENTION

1. Field of the Invention

The present invention relates to an apparatus for optical module test, and more particularly relates to an improved light box performing better quality during an optical module test process.

2. Description of the Related Art

It is well known that an optical module such as a digital camera, a mobile phone camera, a PC camera always needs tests to know if there is any problem with them. One of these tests is performed by using a light box. As shown in FIG. 1, such a conventional light box is given a reference number 10 while an optical module is given a reference number 16. In such test, the resolution, optoelectronic conversion function (OECF), and grey level gradients of the optical module are the features to be examined.

In regard to the conventional light box 10, it is required that the design complies with the standard established by the International Standard Organization (ISO) and Standard mobile imaging architecture (SMIA) when a variety of test charts 15 are chosen for different demands. For example, we may use a standard ISO 12233 test chart 15a as shown in FIG. 2 for testing the resolution of the optical module 16, while use a standard ISO OECF test chart 15b as shown in FIG. 3 for testing the OECF of the optical module 16.

On the other hand, the light box 10 is provided with a lamp 11 and diffuser 12 on the right side while provided with a lamp 13 and a diffuser 14 on the left side. The diffusers 12 and 14 here are used to uniformly distribute the light beams exiting from the lamps 11 and 13 onto the test chart 15, respectively. At the same time, an optical filter 17 is provided between the optical module 16 and the test chart 15 for simulating an environment of light source of various color temperatures.

However, some problems have been encountered with the above-mentioned light box 10. First, the brightness of the light beam from each lamp could be different from the other one for that the life decay of the lamps do not coincide with each other, and which easily results in the non-uniform distribution of brightness and color temperature. Besides, the uniformity degree of brightness of the diffusers is limited by the distance between the lamps and the test chart. Second, since there is the optical filter between the optical module and the test chart, the test result is always affected by the material feature of the optical filter.

In view of these problems, a new light box for optical module test is disclosed. The disclosed light box is able to provide high degree of uniformity for the brightness distribution on the test chart, and an environment of light source of various color temperatures. Especially, the design of the disclosed light box is so totally different from the conventional one that the above mentioned problems can be avoided.

BRIEF SUMMARY OF THE INVENTION

The present invention intends to solve the problems of the conventional light box for optical module test, especially the non-uniform brightness and color temperature distribution due to the multi light source design and the interference by the arrangement of the optical filter between the optical module and the test chart.

It is an object of the invention to provide a light box for optical module test with highly improved the degree of uniformity of brightness distribution.

It is another object of the invention to provide a light box for optical module which is able to simulate an environment of light source of adjustable color temperature.

The light box for optical module test of the present invention includes a light source, a beam splitting unit, an optical filtering module and two optical fibers. The optical filtering module is formed with a plurality of filters and disposed between the light source and the beam splitting unit for generating a variety of color temperatures of the emitting light beam from the light source before it enters the beam splitting unit. And the beam splitting unit is used to uniformly divide the emitting light beam into a first light beam and a second light beam each of which is transmitted by the two optical fibers and projected onto a test chart.

According to one embodiment, the optical filtering module is connected to a motor-powered transmission mechanism connected and controlled by a motor control unit. The control to the motor-powered transmission mechanism drives the exchange between the filters of the optical filtering module so as to simulate the environment of a light source of various color temperatures.

Besides, two adjustable optical fiber retaining mounts are arranged separately by two sides of the light box for fixing the open terminals of the optical fibers, wherein the adjustable optical fiber retaining mounts have adjustable rotating angle around the fixed axis thereof. Thereby, the angle of projection of the first light beam and the second light beam on to the test chart can be adjusted.

It will be apparent to those skilled in art that the present invention has the following advantages. First, only single light source is used to avoid the problem of non-uniform distribution of brightness and color temperature due to the failure of synchrony or coincidence of life decay of several lamps as known in the prior art. Second, the total refection feature of the light beams in the optical fibers greatly improves the degree of uniformity of the brightness distribution of the first light beam and the second light beam from the beam splitting unit. Third, the adjustable optical fiber retaining mounts enable the user to regulate the angle of projection of the first light beam and the second light beam on to the test chart, and which further contributes to the improvement of uniformity of the brightness distribution of the light beam on to the test chart.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 4:
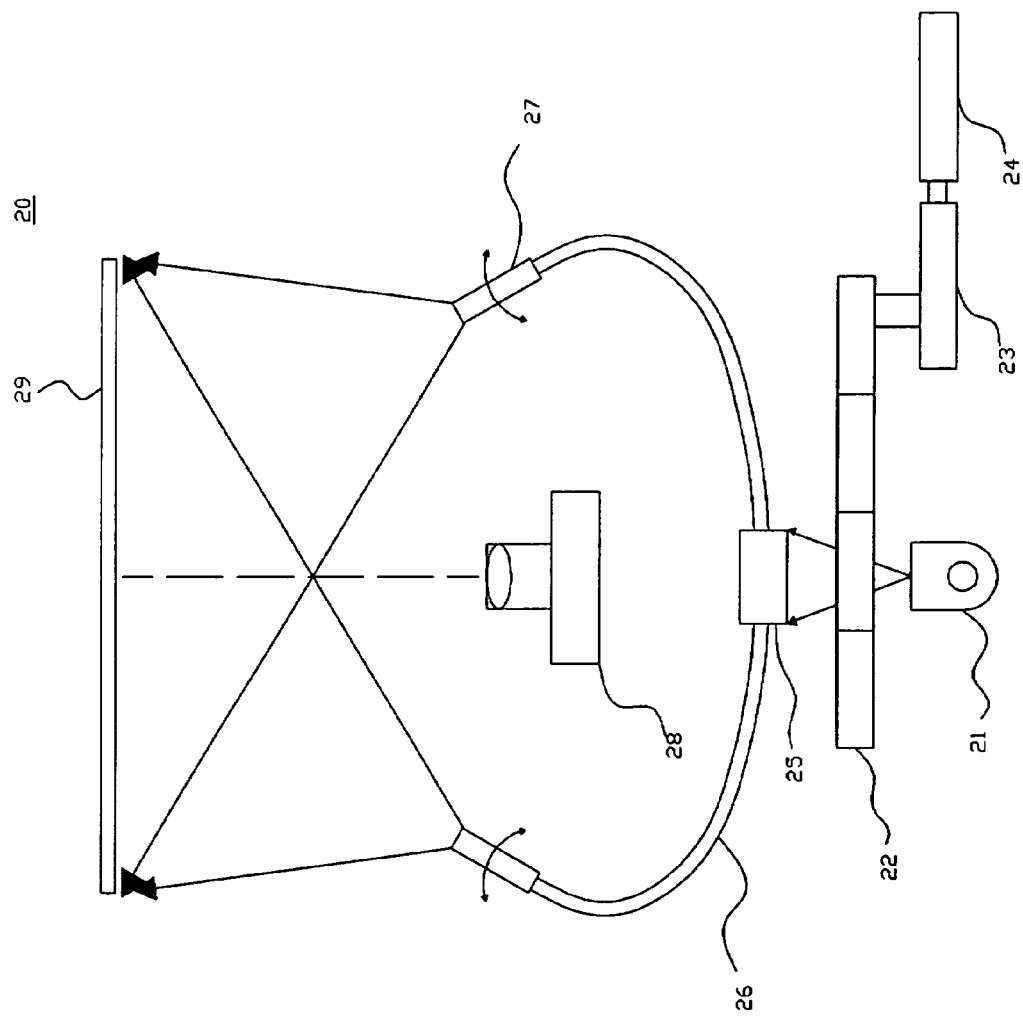
FIG. 4 schematically shows the light box for optical module test according to one embodiment of the invention.

As illustrated in FIG. 4, a light box for optical module test according to a preferred embodiment of the present invention is shown. The light box indicated at 20 has a light source 21 such as a lamp, an optical filtering module 22, a motor-powered transmission mechanism 23, a motor control unit 24, a beam splitting unit 25, two optical fibers 26, and two adjustable optical fiber retaining mounts 27. The light box 20 is used for test of various optic features of an optical module 28 such as a digital camera, a mobile camera, and PC camera. The further detailed description of these elements constructing the light box 20 is as follows.

In regard to the light source 21 region, the beam splitting unit 25 is positioned on the path of the emitting light beam from the light source 21 for uniformly divide the emitting light beam into a first light beam and a second light beam. Besides, the optical filtering module 22 which includes a plurality of filters is disposed between the light source 21 and the beam splitting unit 25 for generating different color temperatures of the emitting light beam from the light source 21 before it enters the beam splitting unit 25, so as to simulate an environment for a light source of color temperatures.

Figure 1:
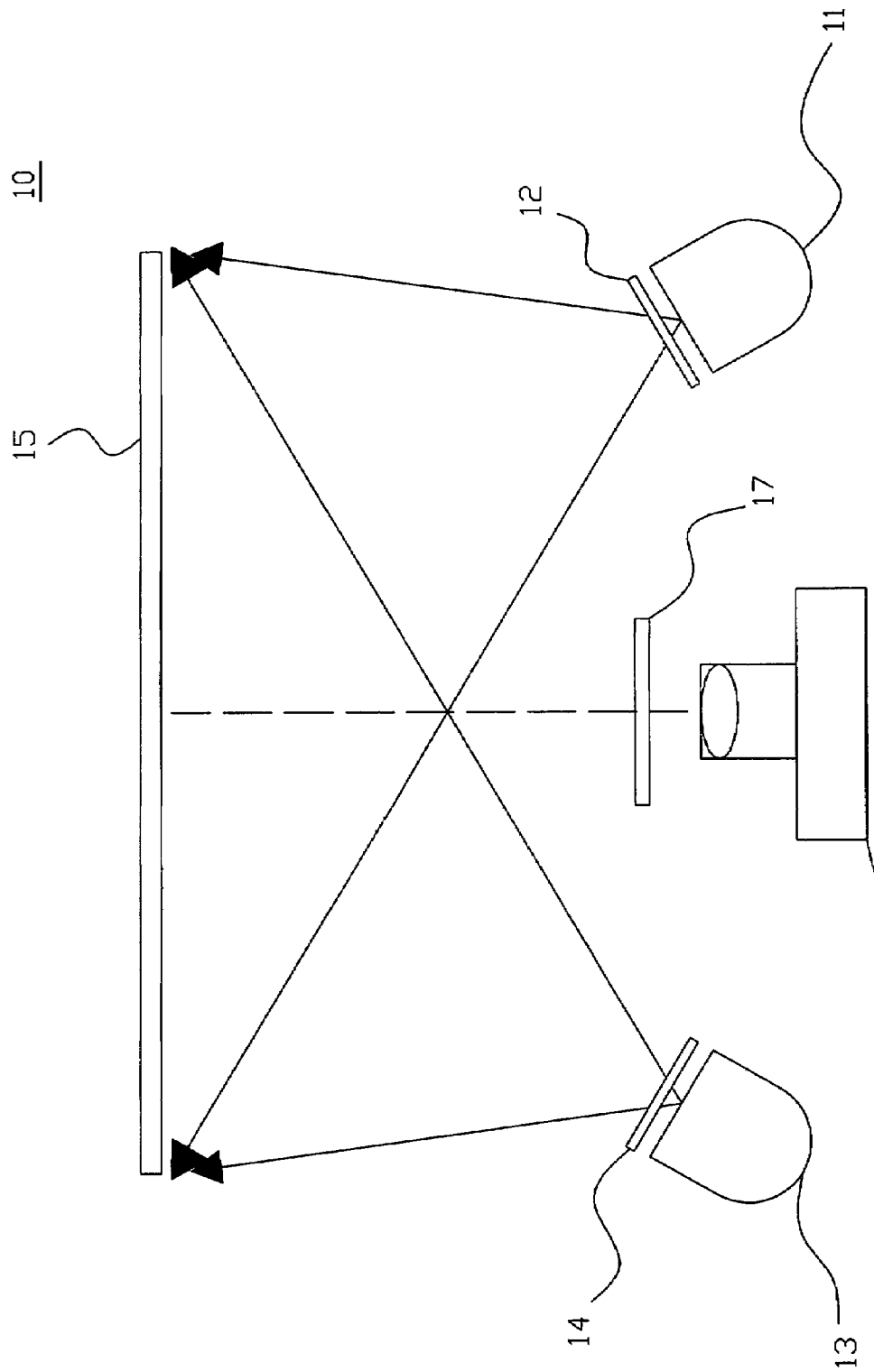
FIG. 1 schematically shows a conventional light box for optical module test.
Figure 2:
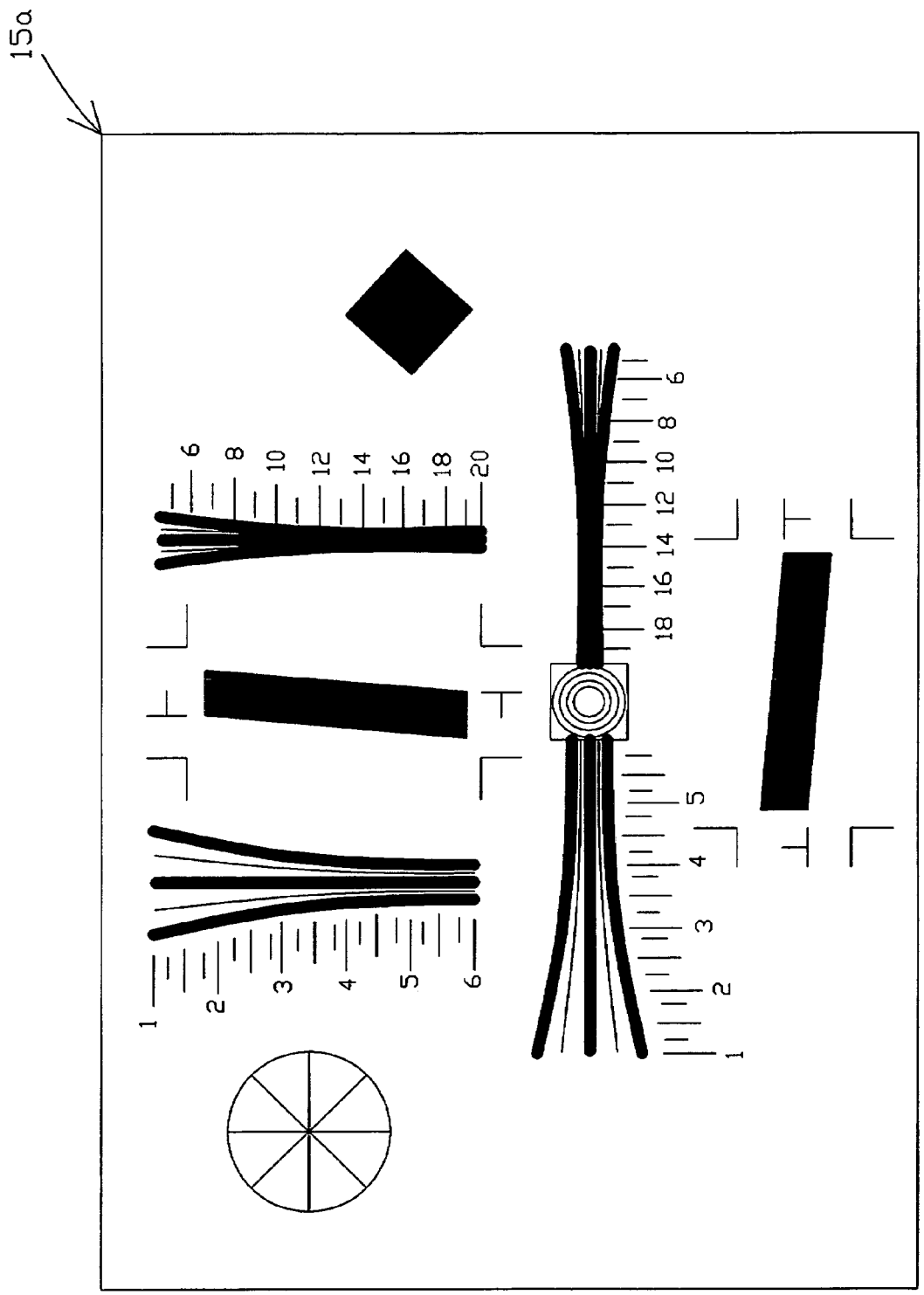
FIG. 2 is a top view partially showing the standard ISO 12233 test chart.
Figure 3:
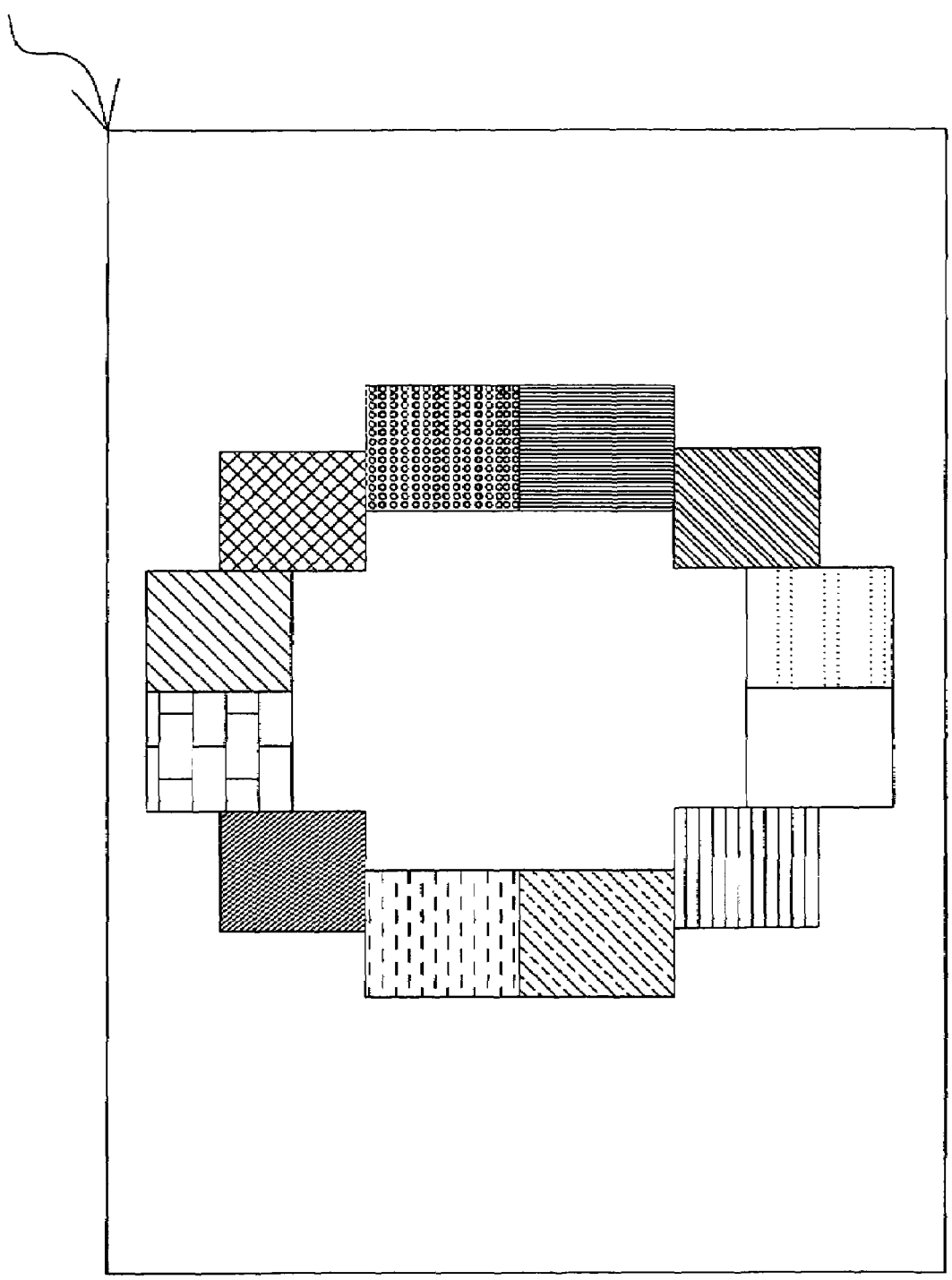
FIG. 3 is a top view partially showing a standard ISO optoelectronic conversion function test chart.

Considering the transmitting of the light beam, the inventor adopts two optical fibers 26 to respectively transmit and thereby project the abovementioned first light beam and second light beam onto an already orientated test chart 29. The test chart 29 here is the same as the prior known test chart 15 such as the standard ISO 12233 test chart 15a as shown in FIG. 2 or the standard ISO OECF test chart 15b as shown in FIG. 3.

In addition, two adjustable optical fiber retaining mounts 27 are arranged separately by two sides of the light box 20 for fixing the open terminals of the optical fibers 26, wherein the adjustable optical fiber retaining mounts 27 each is able to rotate around the fixed axis thereof with the rotation angle being adjustable. Thereby, the angle of projection of the first light beam and the second light beam on to the test chart 29 can be adjusted, and which further improves the uniformity of brightness distribution of the light beam projected onto the test chart.

Furthermore, the light box 20 also has a motor-powered transmission mechanism 23 for connecting and driving the optical filtering module 22, and a motor control unit 24 for connecting and controlling the transmission mechanism 23. The motor control unit 24 controls the transmission mechanism 23 to drive the exchange between the filters of the optical filtering module 22 so as to simulate the environment of a light source of various color temperatures.

Apparently, the disclosed light box of the present invention is designed to have only one light source 21, and in this way the problem of non-uniform distribution of brightness and color temperature due to the failure of synchronization of life decay of several lamps as known in the prior art can be avoided. On the other hand, the disclosed light box of the present invention takes advantage of the total refection of the light beams in the optical fibers 26 to greatly raise the degree of uniformity of the brightness distribution of the first light beam and the second light beam from the beam splitting unit 25. Especially, under the circumstance of using single light source, the drift of color temperature of the first light beam and the second light beam, if exist, is occurred simultaneously, and thus the situation of non-uniform color distribution of the light beam on to the test chart 29 can be avoided.

Moreover, the adjustable optical fiber retaining mounts 27 are helpful in regulating the angle of projection of the first light beam and the second light beam on to the test chart 29 and also contribute to the improvement of uniformity of the brightness distribution of the light beam on to the test chart 29.

It is to be understood that the described embodiments of the invention are illustrative only and that modifications thereof may occur to those skilled in the art. For example, the length and the location of the optical fiber are not limited as long as the optical fibers well perform the transmitting function. Also, the optical filtering module can be drove by other devices accompanying proper circuits other than the motor transmission mechanism and the motor control unit as disclosed. Accordingly, this invention is not to be regarded as limited to the embodiments disclosed, but is to be limited only as defined by the appended claims herein.

What is claimed is:

1. A light box for optical module test, comprising:
   a light source;
   a beam splitting unit uniformly dividing an emitting light beam form the light source into a first light beam and a second light beam;
   an optical filtering module placed between the light source and the beam splitting unit, the optical filtering module including a plurality of filters for generating a variety of color temperatures of the emitting light beam from the light source before the emitting light beam enters the beam splitting unit; and
   two optical fibers respectively transmitting the first light beam and the second light beam and thereby projecting the first light beam and the second light beam onto a test chart.

2. The light box for optical module test as set forth in claim 1, further comprising two adjustable optical fiber retaining mounts arranged separately by two sides of the light box for fixing the open terminals of the optical fibers, wherein the adjustable optical fiber retaining mounts each is able to rotate around a fixed axis with the rotation angle being adjustable.

3. The light box for optical module test as set forth in claim 1, further comprising a transmission mechanism connecting a control unit, the transmission mechanism being connected to the optical filtering module, and the control unit controls the transmission mechanism to drive the exchange between the filters of the optical filtering module.

4. The light box for optical module test as set forth in claim 3, wherein the transmission mechanism is powered by a motor.

5. The light box for optical module test as set forth in claim 1, wherein the optical module is selected from the group consisting of digital camera, mobile phone camera, and PC camera.

6. A light box for optical module test, comprising:
   a light source;
   a beam splitting unit uniformly dividing an emitting light beam from the light source into a first light beam and a second light beam;
   an optical filtering module placed between the light source and the beam splitting unit, the optical filtering module including a plurality of filters for generating a variety of color temperatures of the emitting light beam from the light source before the emitting light beam enters the beam splitting unit;
   two optical fibers respectively transmitting the first light beam and the second light beam and thereby projecting the first light beam and the second light beam onto a test chart;
   two adjustable optical fiber retaining mounts arranged separately by two sides of the light box for fixing the open terminals of the optical fibers, wherein the adjustable optical fiber retaining mounts each is able to rotate around a fixed axis with the rotation angle being adjustable;
   a transmission mechanism connected to the optical filtering module; and a control unit connected to the transmission mechanism for controlling the transmission mechanism to drive the exchange between the filters of the optical filtering module.

7. The light box for optical module test as set forth in claim 6, wherein the optical module is selected from the group consisting of digital camera, mobile-phone camera, and PC camera.

8. The light box for optical module test as set forth in claim 6, wherein the transmission mechanism is powered by a motor.

* * * * *